(12) United States Patent
Mazouffre et al.

(10) Patent No.: US 10,961,989 B2
(45) Date of Patent: Mar. 30, 2021

(54) ION THRUSTER WITH EXTERNAL PLASMA DISCHARGE

(71) Applicant: CENTRE NATIONAL DE LA RECHERCHE SCIENTIFIQUE-CNRS, Paris (FR)

(72) Inventors: Stéphane Mazouffre, Orleans (FR); Sedina Tsikata, Orleans (FR)

(73) Assignee: CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 63 days.

(21) Appl. No.: 16/341,021

(22) PCT Filed: Oct. 11, 2017

(86) PCT No.: PCT/FR2017/052789
§ 371 (c)(1),
(2) Date: Apr. 10, 2019

(87) PCT Pub. No.: WO2018/069642
PCT Pub. Date: Apr. 19, 2018

(65) Prior Publication Data
US 2020/0040877 A1   Feb. 6, 2020

(30) Foreign Application Priority Data
Oct. 11, 2016  (FR) ...................................... 1659808

(51) Int. Cl.
*F03H 1/00* (2006.01)
*B64G 1/40* (2006.01)

(52) U.S. Cl.
CPC ........... *F03H 1/0075* (2013.01); *B64G 1/405* (2013.01); *F03H 1/0081* (2013.01)

(58) Field of Classification Search
CPC ...................... F03H 1/0075; F03H 1/00–0093
See application file for complete search history.

(56) References Cited

U.S. PATENT DOCUMENTS

| 5,646,476 A * | 7/1997 | Aston ................... F03H 1/0075 313/154 |
| 6,982,520 B1 * | 1/2006 | de Grys ................ F03H 1/0075 313/231.31 |
| 2012/0187843 A1 | 7/2012 | Madocks |
| 2015/0128560 A1 | 5/2015 | Conversano et al. |
| 2017/0152840 A1 | 6/2017 | Yamazaki et al. |

FOREIGN PATENT DOCUMENTS

WO    2015/177938 A1    11/2015

OTHER PUBLICATIONS

Loyan "Middle power Hall Effect Thrusters with centrally located cathode" (Year: 2013).*

* cited by examiner

*Primary Examiner* — Gerald L Sung
*Assistant Examiner* — William L Breazeal
(74) *Attorney, Agent, or Firm* — BakerHostetler

(57) ABSTRACT

An ion thruster is provided allowing a plasma discharge to be generated and confined in an external confinement space created by an external magnetic field B.

10 Claims, 4 Drawing Sheets

ION THRUSTER WITH EXTERNAL PLASMA DISCHARGE

CROSS-REFERENCE TO RELATED APPLICATIONS

This application is a National Stage of International patent application PCT/FR2017/052789, filed on Oct. 11, 2017, which claims priority to foreign French patent application No. FR 16 59808, filed on Oct. 11, 2016, the disclosures of which are incorporated by reference in their entirety.

FIELD OF THE INVENTION

BACKGROUND

Ion thrusters, also called plasma or electric thrusters, for space vehicles, allow fuel consumption to be significantly decreased by virtue of a high ejection speed of the latter. However, these thrusters, as opposed to chemical thrusters, have a relatively limited thrust. Thus, they must operate for a very long time, possibly for as much as several years of cumulative firing, in order to allow the space vehicle to achieve a high final speed. The lifetime of ion thrusters is therefore a criterion of primary importance. This lifetime is limited by wear of components, in particular wear of the system for generating the electric field that generates a plasma discharge and accelerates the ions of the fuel and wear of the internal space of the ion thruster in which the plasma discharge is confined. This wear of components originates from the direct interaction of said elements with the plasma discharge.

For example, the ion thrusters described in US 2015/0128560, U.S. Pat. No. 5,646,476 and US 2012/0187843 have a limited lifetime because the generated plasma discharge is confined in their internal space.

Surprisingly, the Applicant has found that it is possible to overcome these problems of wear of materials by virtue of an ion thruster that allows a plasma discharge to be created and said discharge to be confined outside the thruster.

SUMMARY OF THE INVENTION

Thus, the invention relates, according to a first aspect, to an ion thruster comprising:

a body having a symmetry of revolution about an axis of revolution (Ox) and a cross section in a plane passing through the axis of revolution (Ox) having the shape of a capital E, the body comprising within it a magnetic circuit, a first element that generates a magnetic field and a second element that generates a magnetic field, said first element being placed in the cross section in the central arm of the capital E, and said second element, which is an annular element, having a symmetry of revolution about the axis of revolution (Ox) and being placed in the cross section S in the upper and lower arms of the capital E, the first element and the second element that generate a magnetic field having an opposite magnetic polarity, and an anode covering an internal annular space, said annular space having a symmetry of revolution about the axis of revolution (Ox) and corresponding, in the cross section, to the counter of the capital E, said anode being such that, in operation, it allows the passage of the gas from the internal annular space to the external portion of the thruster in the direction [O $\vec{x}$ ), a gas line passing through the body and opening into said internal annular space a diffuser placed in said internal annular space, and a cathode that is mechanically joined to the body, characterized in that the diffuser and the anode occupy at least 50%, preferably from 60 to 100% and preferentially from 75% to 95% of the internal annular space (7).

According to a second aspect, the invention also relates to the use of the ion thruster according to the invention to propel a space vehicle such as a probe, a satellite, a space capsule, a space shuttle or a space station.

According to a third aspect, the invention also relates to a method for generating propulsive thrust for a space vehicle by means of an ion thruster according to the invention comprising the following steps:

a) introducing a gas via a gas line into an internal annular space of the ion thruster, b) generating an external electric field $\vec{E}$ via an anode and a cathode and generating an external magnetic field $\vec{B}$ via a first element and an annular second element that generate a magnetic field thus creating a confinement space external to the ion thruster, the external confinement space and the internal annular space being positioned on either side of the anode, c) ionizing the gas introduced into the internal annular space with the external electric field $\vec{E}$, and generating a plasma discharge from the ionized gas in the external confinement space, d) confining the plasma discharge in the external confinement space, e) accelerating the ions of the plasma discharge with the electric field and ejecting the ions out of the confining space.

f) supplying via the cathode the electrons required to ensure the plasma discharge and electrical neutrality are maintained.

BRIEF DESCRIPTION OF THE DRAWINGS

FIG. 1a shows a cross section along the axis (Ox) of an orthogonal coordinate system (O, x, y, z) of one embodiment of the ion thruster according to the invention, in which figure the electric and magnetic fields generated during use of said thruster are schematically shown.

FIG. 1b shows a cross section along the axis AA' of FIG. 1a.

FIG. 1c shows a front view of the embodiment of FIG. 1a.

DETAILED DESCRIPTION

Figures 1A, 1B:
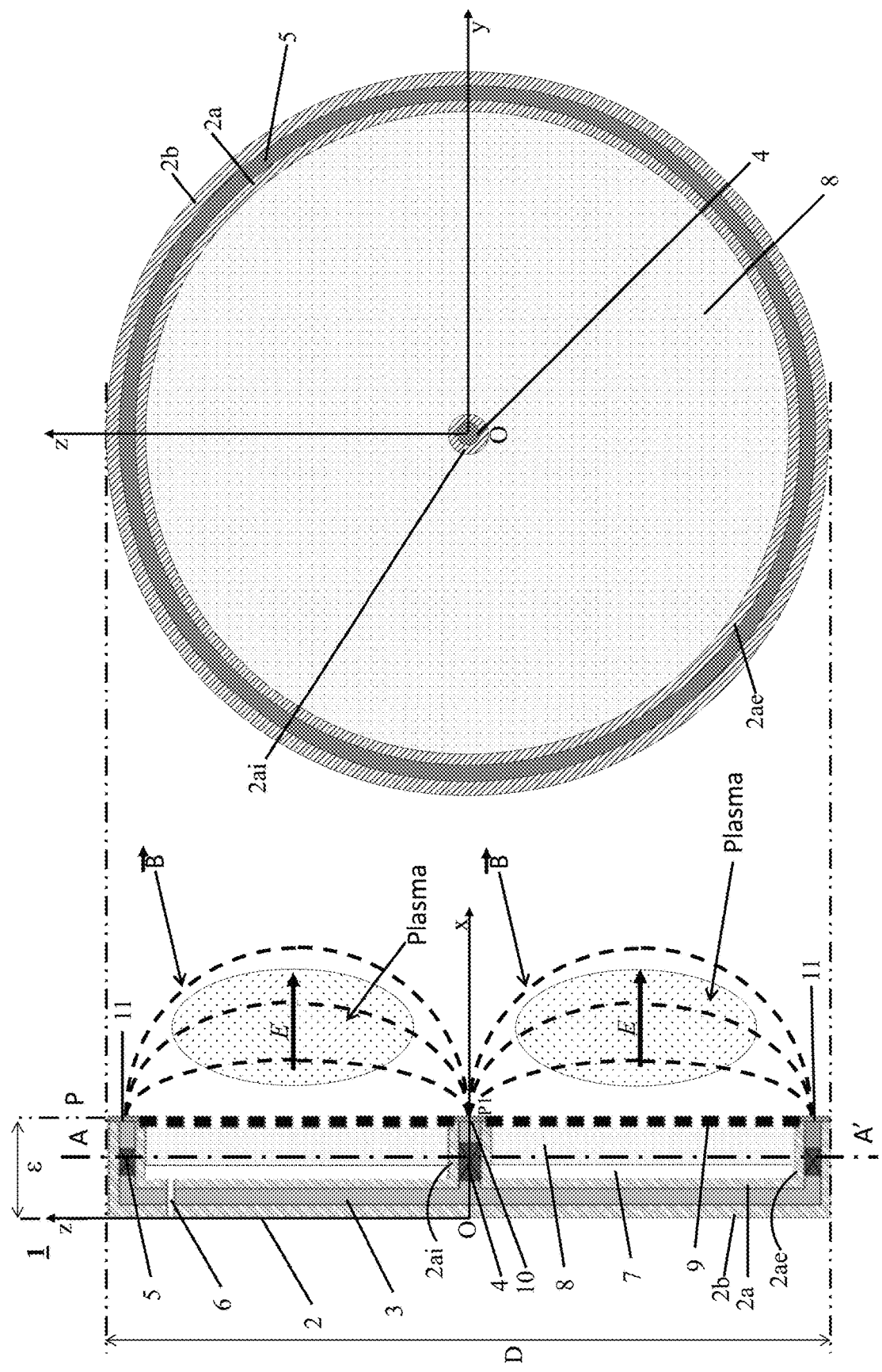

The present invention is described below with reference to FIGS. 1 to 3.

According to a first aspect, the present invention relates to an ion thruster 1 comprising:

a body 2 having a symmetry of revolution about an axis of revolution (Ox) and having the general shape of a capital E in a cross section in a plane passing through the axis of revolution (Ox), the body 2 comprising within it a magnetic circuit 3, an element 4 that generates a magnetic field and an annular element 5 that generates a magnetic field, said element 4 being placed in the cross section in the central arm of the capital E, and said annular element 5 having a symmetry of revolution about the axis of revolution (Ox) and being placed in the cross section in the upper and lower arms of the capital E, the element 4 and the annular element 5 having an opposite magnetic polarity, an anode 9 covering an internal annular space 7, said annular space having a symmetry of revolution about the axis of revolution (Ox) and corresponding, in the cross section, to the counter of the capital E, said anode 9 being such that, in operation, it allows the passage of the gas from the internal annular space 7 to the external portion of the shield in the direction [O $\vec{x}$], a gas line 6 passing through the body 2 and opening into the internal annular space 7 a diffuser 8 placed in said internal annular space 7, and a cathode (not shown) that is mechanically joined to the body 2, characterized in that the diffuser 8 and the anode 9 occupy at least 50%, preferably from 60 to 100% and preferentially from 75% to 95% of the internal annular space 7.

In the present invention, the cross section passing through the axis of revolution (Ox) is also called the "cross section".

In the context of the present invention, the term "counter" designates the one or more open interior spaces of certain letters.

In the context of the present invention, any element qualified "internal" is comprised in the internal portion of the ion thruster 1, i.e. in the zone comprised between the plane (Oy, Oz) and the plane P of the anode, i.e. the plane parallel to the plane (Oy, Oz) passing through $P_1$, whereas any element qualified "external" is comprised outside of this zone. The internal annular space 7 is therefore comprised in the internal portion of the ion thruster 1.

In the context of the present invention, the direction [O $\vec{x}$] is the direction along the axis of revolution (Ox) extending from the internal portion of the ion thruster 1 to the external portion of the ion thruster 1.

According to one embodiment, the body 2 which has a symmetry of revolution about the axis (Ox) may in particular be of circular general shape of radius D/2. It is formed from a double jacket 2a, 2b in which the magnetic circuit 3 is placed. In a cross section passing through the axis (Ox), this double jacket has the shape of a capital E. The external jacket 2b is essentially planar, perpendicular to the axis (Ox), its external end is folded perpendicularly to the direction [O $\vec{x}$]. The internal jacket 2a is essentially planar, of annular shape of axis of revolution (Ox), each of its internal and external ends 2ai, 2ae being folded perpendicularly in the direction [O $\vec{x}$]. The ends of the double jacket correspond in the cross section to the arms of the E.

In the double jacket forming the body 2 of the thruster is placed a magnetic circuit that is a device made from a material capable of conveying a sufficient magnetic flux to generate outside a magnetic field the strength of which is higher than 100 G, this strength being measured along an axis parallel to the axis (Ox) and distant by D/4. Typically, the material capable of conveying such a magnetic flux may be chosen from iron, iron-cobalt alloys, and the ferrites. Depending on the material chosen, the magnetic circuit 3 may partially or entirely fill the body 2. The magnetic circuit 3 connects elements 4 and 5. It allows the magnetic field to be oriented toward the external portion of the thruster and it allows the desired shape to be given to the external magnetic field lines. In the absence of such a magnetic circuit, the loss of useful magnetic energy would be very large.

According to the invention, the anode 9 is a generally planar device made of an electrically and thermally conductive material. It is placed facing the body 2 such that it covers the internal annular space 7. In the embodiments illustrated in FIGS. 1 to 3, the anode 9 extends, in the cross section, from the central arm to the upper and lower arms of the capital E; the anode therefore passes through the plane P, i.e. the plane parallel to the plane (Oy, Oz) passing through $P_1$ (which is the point of intersection of the plane P and of the axis of revolution (Ox)). In one particular embodiment, the anode is of annular general shape. It is such that it allows the passage of the gas from the internal annular space 7 to the external portion of the ion thruster 1 in the direction [O $\vec{x}$].

Figure 1C:
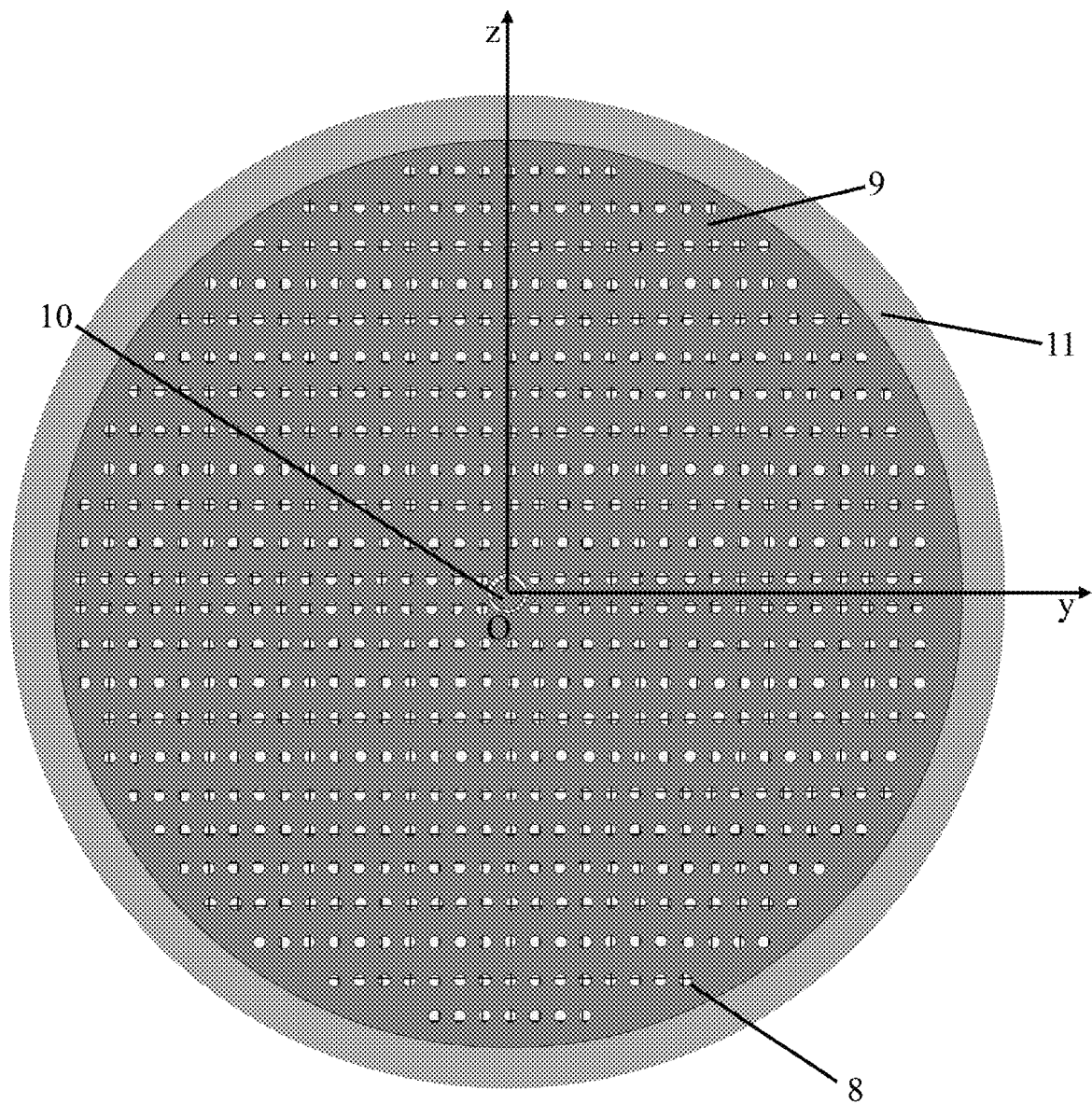

Advantageously, the anode 9 is perforated so as to allow this passage of the gas. In one embodiment, such as shown in FIGS. 1a and 1c, the anode comprises orifices placed regularly about the axis of revolution (Ox) and being placed in the cross section between the central arm and the lower and upper arms of the capital E.

Figure 2:
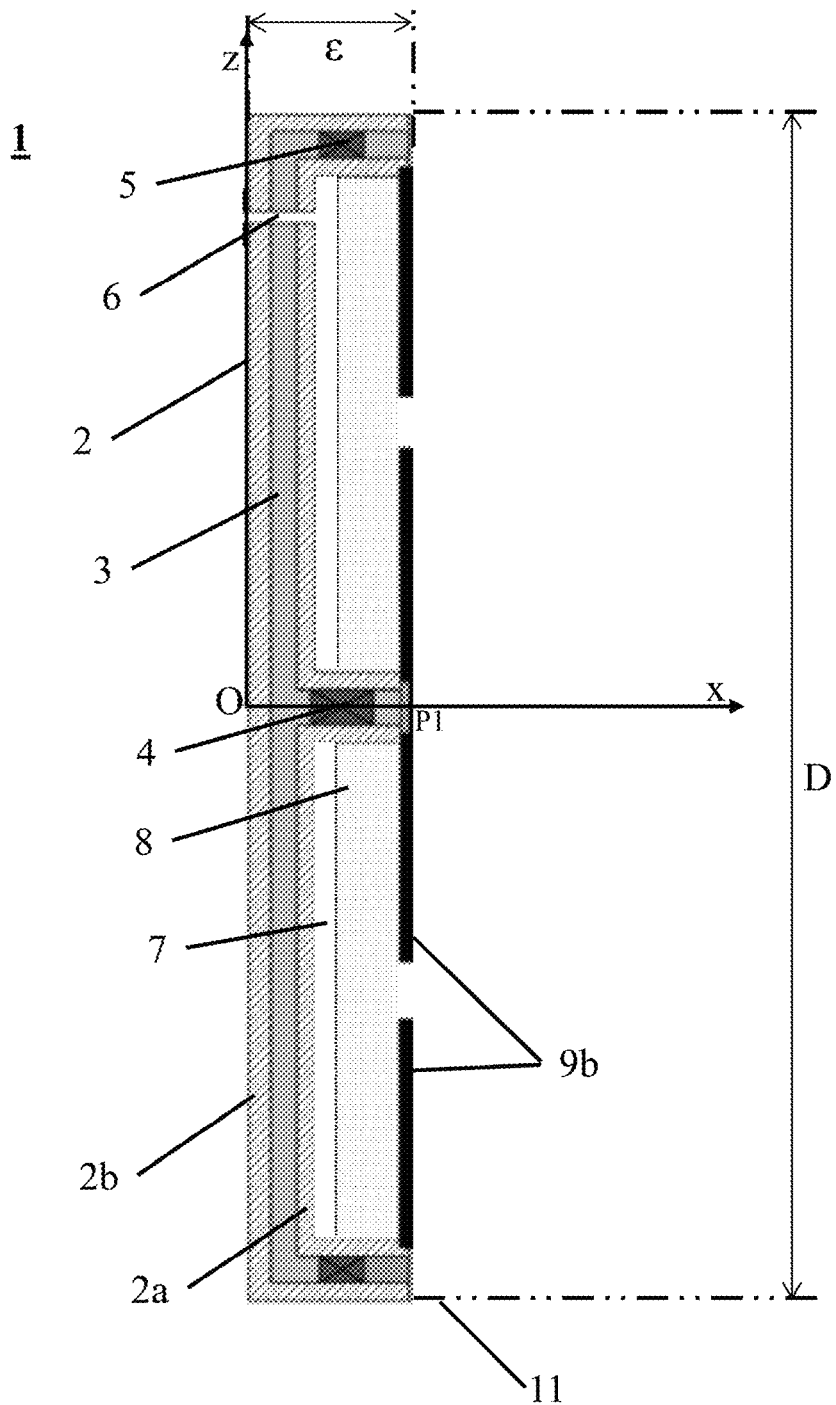
FIGS. 2 and 3 each show the cross section along the axis (Ox) of two separate embodiments of the ion thruster according to the invention.
Figure 3:
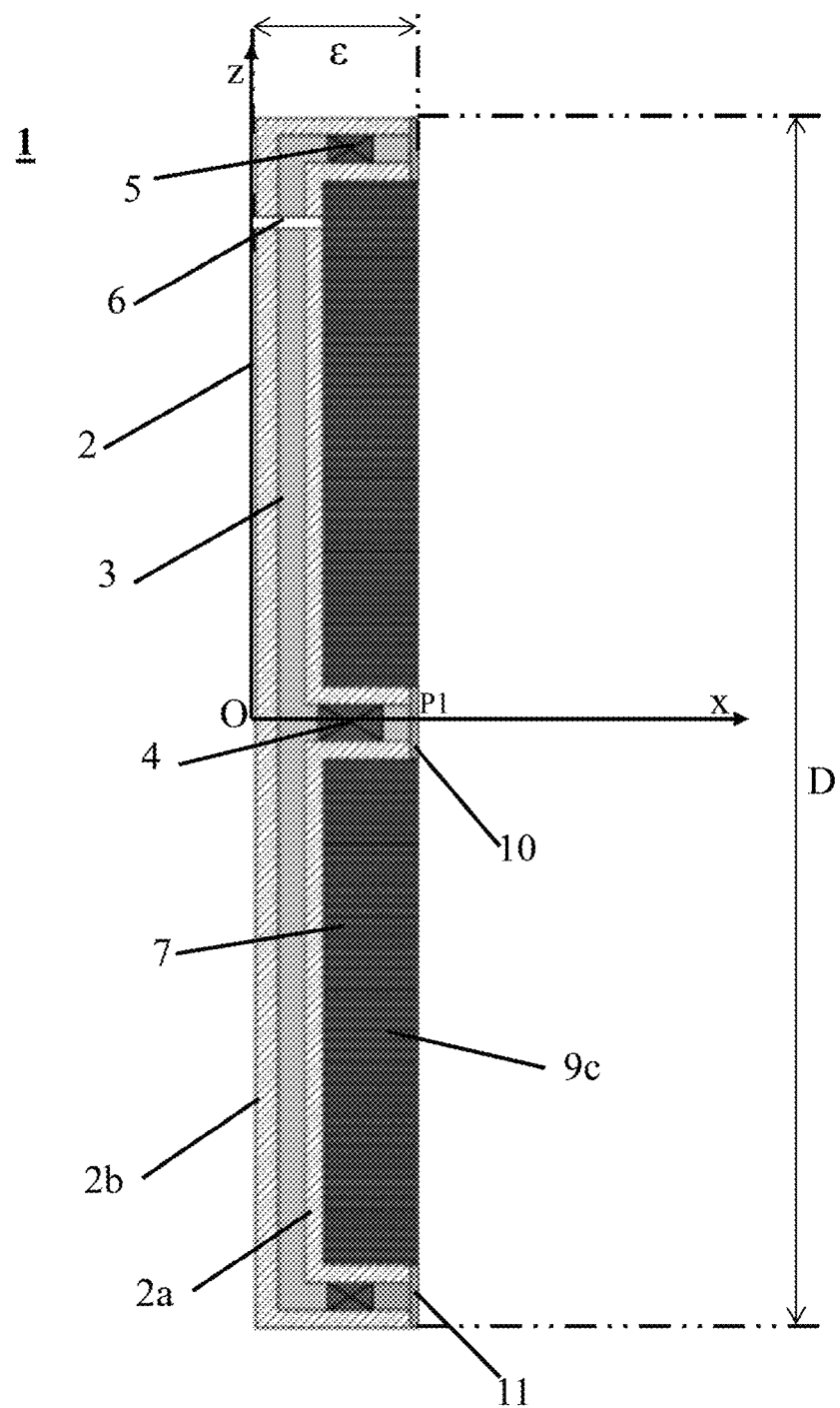

In another embodiment, such as shown in FIG. 2, the anode comprises an annular orifice, the annular orifice having a symmetry of revolution about the axis of revolution (Ox) and being placed in the cross section S between the central arm and the lower and upper arms of the capital E.

According to the invention, the diffuser 8 is a device comprising a porous or cellular material or indeed a chicaned mechanical device that is resistant to heat. The diffuser 8, which is placed in the internal annular space 7, allows the uniformity of the gas introduced into the internal annular space 7 via the gas line 6 to be increased. It is generally not electrically conductive.

However, according to one particular embodiment, the diffuser may be electrically conductive and then play the role of an anode. Thus, in one embodiment, such as illustrated in FIG. 3, the anode and the diffuser are one and the same element.

The diffuser 8 may be made of a porous or cellular material chosen from ceramics such as the mullites; metal foams in the case of a conductive diffuser, and mixtures thereof.

In order to increase the uniformity of the gas introduced via the gas line 6 into the internal annular space 7, the diffuser 8 may have a porosity (or largest passing dimension of the cells) of about 1 micron to 1 millimeter. The porosity must not be too low because it must allow the passage of the gas but it must not be too high so that the uniformity of the gas is satisfactorily increased and so that the plasma does not penetrate into the diffuser. The porosity of the diffuser may be measured by Hg porosimetry and by electron microscope.

The gas line 6 is a device allowing a gas to be introduced from the external portion of the ion thruster 1 through the body 2 into the internal annular space 7. Typically, the ion thruster 1 according to the invention may comprise 1, 2 or 3 gas lines 6; more particularly, the ion thruster 1 according to the invention may comprise 1 gas line 6.

In the context of the present invention, the term "cathode" is understood to mean a device made of an electrically conductive material that emits electrons.

The anode 9 and the cathode generates an external electric field $\vec{E}$ that ionizes the gas of increased uniformity passing through the anode 9, thus generating a plasma discharge in the external portion of the ion thruster 1 according to the invention.

The element 4 that generates a magnetic field, just like the annular element 5 that generates a magnetic field, is a device intended to produce an external magnetic field. They are chosen independently of each other from a permanent magnet and a magnetic coil. Each of the elements 4 and 5 may be both a permanent magnet and a magnetic coil. In addition their magnetic polarity is different, i.e. if the element 4 that generates a magnetic field has a north pole then the annular element 5 that generates a magnetic field has a south pole, and vice versa.

Typically, the element 4 may have a cylindrical general shape or an annular general shape comprising one or more elements.

In the context of the present invention, the expression "permanent magnet" is understood to mean a device made of a ferromagnetic alloy comprising an atom chosen from iron, cobalt and nickel, and an atom from the lanthanide series, the permanent magnet preferably being a device made from a ferromagnetic alloy of formula $Fe_2O_3XO$, where X is an atom of manganese, zinc, cobalt or nickel. Preferably, the permanent magnet is a device made of AlNiCo, SmCo or NdFeB or mixtures thereof.

The element 4 and the annular element 5 generate an external magnetic field $\vec{B}$. The external magnetic field $\vec{B}$. In addition, the magnetic field $\vec{B}$ being external, its maximum is present in the external portion of the ion thruster 1. It may either be of negative gradient or of positive then negative gradient in the direction [Ox] with a maximum in the vicinity of the plane P. Its field lines are curved and pass, in the cross section, through the serifs of the central arm and of the lower and upper arms of the capital E. This topology allows the intersection of these field lines with the anode 9 to be decreased and therefore allows the direct magnetic interaction between the anode 9 and the external magnetic field $\vec{B}$ to be decreased and the lifetime of the anode 9 and therefore of the ion thruster 1 according to the invention to be increased.

The maximum strength of the external magnetic field $\vec{B}$ is higher than the maximum strength of the internal magnetic field generated in a conventional ion thruster. Typically, the maximum strength of the external magnetic field $\vec{B}$ is 100 to 1000 G, and preferably from 300 to 800 G, this strength being measured along an axis parallel to the axis (Ox) and distant by D/4.

Advantageously, the topology and the strength of the external magnetic field $\vec{B}$ thus create an external confinement space allowing the plasma discharge to be confined in the external portion of the ion thruster 1 according to the invention. This external confinement space and the internal annular space 7 are positioned on either side of the anode 9.

In the ion thruster 1 according to the invention, the diffuser 8 and the anode 9 occupy at least 50%, preferably from 60 to 100%, and preferably from 75 to 95% of the internal annular space 7.

Without wanting to be tied to any one theory, the inventors are of the opinion that the occupation of the internal annular space 7 by the diffuser 8 and the anode 9, the latter being such as defined above, allows the plasma discharge to be created and said discharge to be confined in the external portion of the ion thruster 1, and in particular in the external confinement space.

In addition, by virtue of this occupation of the internal annular space 7 by the diffuser 8 and the anode 9, the latter being such as defined above, the body 2 of the ion thruster 1 according to the invention has a size that is 2.5 to 5 times smaller than the size of the body of a conventional ion thruster. Specifically, the body 2 has a diameter D 5 to 10 times larger than its thickness ε, the diameter D being the largest dimension of the body 2 and the thickness ε being the distance between the points O (which is the point of intersection between the external jacket 2b and the axis of revolution (Ox)) and P1 (which is the point of intersection of the plane P and the axis of revolution (Ox)). In comparison, the body of a conventional ion thruster has a diameter of 2 to 4 times its height. The ion thruster 1 according to the invention is therefore advantageously thinner than a conventional ion thruster. The ion thruster 1 according to the invention is therefore lighter than a conventional ion thruster.

Advantageously, the body 2 of cylindrical general shape, and in particular of circular general shape, promotes the generation of the external magnetic field $\vec{B}$.

According to one embodiment, the body 2 may be made of a material chosen from the ceramics, such as alumina, zirconia and carbide; metals such as tantalum and aluminum; polymers such as polyether ether ketone (PEEK) and thermosets; carbon; and mixtures thereof.

According to one particular embodiment, the constituent jacket 2a and the constituent jacket 2b of the body may be made of different materials.

According to one embodiment, the anode 9 may be made of a material chosen from metals such as aluminum, tantalum and steels, or carbon and mixtures thereof.

Since the direct interaction of the ion thruster according to the invention with the plasma discharge is small, the materials of the body, 2b in particular, of the diffuser 8 and of the anode 9 do not need to resist the stresses generated by the plasma discharge created and confined in the external portion of the ion thruster 1 according to the invention. Advantageously, these materials are less expensive, lighter and easier to destroy on re-entry into the atmosphere than those employed in a conventional ion thruster. The ion thruster 1 according to the invention is therefore more economical than a conventional ion thruster and creates little or no space debris.

Typically, the anode 9 may have various configurations. For example, the anode 9 may be a disk so that it does not make contact with the lower and upper arms of the capital E. The anode 9 may also be a ring having a symmetry or an asymmetry of revolution about the axis of revolution (Ox) and comprising an annular orifice having a symmetry or an asymmetry of revolution about the axis of revolution (Ox), said orifice being placed so that the anode 9 makes contact at least with the central arm of the capital E. The anode 9 may also be a multiple ring having a symmetry or an asymmetry of revolution about the axis of revolution (Ox) and comprising at least two annular orifices having a symmetry or an asymmetry of revolution about the axis of revolution (Ox), said annular orifices being placed so that the anode 9 makes contact at least with the central arm of the capital E. The anode 9 may also be a grid.

Whatever the configuration of the anode 9, it is preferable for, in the vicinity of an axis parallel to (Ox) and distant by D/4, the surface of the anode 9 to be parallel to the lines of the external magnetic field $\vec{B}$ in order for the anode 9 to be magnetically screened. Advantageously, this allows the direct interaction between the anode 9 and the external plasma discharge to be decreased, and therefore the lifetime of the anode 9 and therefore of the ion thruster 1 according to the invention to be increased.

In addition to the magnetic interaction, the anode 9 undergoes, owing to the plasma discharge, a thermal stress. This thermal stress is decreased by the external confinement of said plasma discharge.

According to one particular embodiment, the anode 9 may make contact with the diffuser 8.

According to another particular embodiment, the anode 9 and the diffuser 8 may be the same element. Advantageously, using a single element instead of two allows the size and the mass of the ion thruster 1 to be decreased.

Typically, the cathode is comprised in the external portion of the thruster.

According to one particular embodiment, the cathode may be comprised in the internal portion of the ion thruster 1 according to the invention.

According to this embodiment, the cathode may be placed, in the cross section, in the central arm of the capital E, and preferably in the element 4 having an annular general shape. The cathode may also be annular and be placed in the cross section S in the lower and upper arms E of the body 2. Advantageously, the ion thruster 1 according to this embodiment is small in size.

According to this embodiment, the cathode must be made of an electron emitter that emits electrons at relatively low temperature in order not to damage the element 4 and the annular element 5 that generate a magnetic field. Typically, this material is a calcium aluminate such as dodecacalcium hepta-aluminate $C_{12}A_7$.

According to one embodiment, the ion thruster 1 furthermore comprises a protection of the magnetic poles 10 and an annular protection of the magnetic poles 11. The protection 10 covers the serif of the central arm of the capital E. The annular protection 11 covers the serif of the lower and upper arms of the capital E. Advantageously, these two protections allow the second end of the body 2 to be protected from the external magnetic field $\vec{B}$ and therefore the lifetime of the ion thruster 1 to be increased.

Typically, the protection 10 and the annular protection 11 are made of a material chosen from the ceramics, such as alumina; metals, such as aluminum or tantalum; carbon; and mixtures thereof; and preferably from aluminum, carbon, or mixtures thereof.

The ion thruster 1 according to the invention may furthermore comprise thermal drains in order to dissipate the thermal load generated by the plasma discharge and to maintain the ion thruster 1 at a relatively low temperature, i.e. from 100 to 200° C., such as measured level with the magnets. Specifically, maintaining the ion thruster 1 in this temperature range avoids damaging elements of the ion thruster 1 such as the anode 9, the element 4 and the annular element 5 that generate a magnetic field, and therefore increases the lifetime of the ion thruster 1. Typically, the drains may be connected to radiators that dissipate the heat radiatively in order to facilitate the maintenance of the ion thruster 1 in this temperature range.

On account of its properties, in particular its small size and its low mass, and the ability to generate a plasma discharge in the external portion of the ion thruster 1 according to the invention and to confine said plasma discharge in the external confinement space, for example in the vacuum of space, the ion thruster 1 according to the invention may be used to propel a spatial vehicle such as a probe, a satellite, a space capsule, a space shuttle or a space station.

Typically, the ion thruster 1 according to the invention is suitable for any type of satellite, in particular satellites of low mass such as mini-satellites, micro-satellites, nano-satellites and cubesats, in particular mini-satellites and micro-satellites, but also to satellites of large sizes.

Advantageously, generating and confining the plasma discharge in this external confinement space allows the direct interaction of the elements of the ion thruster according to the invention with the plasma discharge to be decreased. With respect to a conventional ion thruster, the lifetime of the ion thruster according to the invention is therefore increased. In addition, by decreasing the direct interaction of the elements of the ion thruster according to the invention with the plasma discharge, losses to the walls of the elements are significantly decreased, and the ion thruster according to the invention therefore has a good efficiency and a consumption lower than that of a conventional ion thruster. Since the ion thruster according to the invention does not have to undergo all the stresses generated by the plasma discharge, elements the materials of which are less expensive, lighter and easier to destroy on re-entry into the atmosphere than those employed in a conventional ion thruster may be used. For the same reason, the ion thruster according to the invention may operate at higher voltages than a conventional ion thruster and therefore at high specific impulse, this decreasing its consumption. The ion thruster according to the invention may also employ alternative fuels that are less expensive than xenon, which is employed in a conventional ion thruster. The ion thruster according to the invention therefore advantageously has a longer lifetime than a conventional ion thruster while being smaller, lighter, more economical and creating little or no space debris in accordance with the relevant regulations.

With respect to conventional ion thrusters, the ion thruster according to the invention, because the plasma discharge is external, is more easily extrapolatable to large sizes requiring a high thrust, and is particularly suitable for extrapolation to small sizes because wall effects are less limiting than in conventional thrusters.

According to another aspect, the invention relates to a method for generating a propulsive thrust for a space vehicle by means of an ion thruster 1 according to the invention comprising the following steps:

a) introducing a gas via the gas line 6 into the internal annular space 7 of the ion thruster 1, b) generating the external electric field $\vec{E}$ via the anode 9 and a cathode and generating an external magnetic field $\vec{B}$ via the element 4 and the annular element 5 that generate a magnetic field thus creating a confinement space external to the ion thruster 1, the external confinement space and the internal annular space being positioned on either side of the anode 9, c) ionizing the gas introduced into the internal annular space 7 with the external electric field $\vec{E}$, and generating a plasma discharge from the ionized gas in the external confinement space, d) confining the plasma discharge in the external confinement space, e) accelerating the ions of the plasma discharge with the electric field and ejecting the ions out of the confining space, and f) supplying via the cathode the electrons required to ensure the plasma discharge and electrical neutrality are maintained.

In the above method, steps a) to e) may be carried out simultaneously or sequentially.

The method is particularly suitable for a space vehicle such as a probe, a satellite, a space capsule, a space shuttle or a space station. The method according to the invention is most particularly suitable for satellites of low mass such as mini-satellites, micro-satellites, nano-satellites and cubesats, in particular mini-satellites and micro-satellites.

In step a) a gas is introduced into the internal annular space 7 via the gas line 6. Typically this gas is a rare gas such as krypton, argon, xenon or a mixture thereof.

Advantageously, using krypton or argon significantly increases the financial advantageousness of the method of the invention.

Typically, the gas may be introduced in the vicinity of the diffuser 8 or directly into the diffuser 8.

In the method according to the invention, the interaction between the ion thruster and the plasma discharge is small because the plasma discharge is generated and confined in the external confinement space. The external electric field $\vec{E}$ and the external magnetic field $\vec{B}$ may therefore be generated in step b) with higher operating voltages than a conventional ion thruster without decreasing the lifetime of the ion thruster 1 according to the invention. Typically, these operating voltages are about 100 volts to 1000 volts, and in particular about 200 volts to 600 volts.

Advantageously, an operating voltage in the above ranges allows operation at high specific impulse, this having the effect of decreasing the gas consumption of the ion thruster 1.

In step d), the plasma discharge is confined in the external confinement space thus forming a confined plasma discharge. In step e) the ions of this confined plasma discharge are accelerated by the electric field and ejected out of the confinement space.

The invention claimed is:

1. An ion thruster comprising:
   a body, wherein the body has circular symmetry about an axis of revolution, the body including an axially aft portion, a central portion and an annular portion, an axially aft surface of the axially aft portion defining an axially aft plane perpendicular to the axis of revolution wherein the central portion and the annular portion protrude axially fore from the axially aft portion, wherein the central portion lies along the axis of revolution, wherein the annular portion is radially displaced from the central portion, wherein the axially aft portion, central portion and the annular portion have circular symmetry about the axis of revolution, wherein a cross-section of the body along the axis of revolution has a shape of a capital E, wherein a central arm of the capital E is a cross-section of the central portion along the axis of revolution, and wherein a pair of radially outward arms of the capital E are a cross-section of the annular portion along the axis of revolution, the body comprising a magnetic circuit within the body, a central element that generates a first magnetic field having a first polarity and an annular element that generates a second magnetic field having a second polarity opposite the first polarity, said central element being placed in the central portion, and said annular element being placed in the annular portion,
   an anode having an axially fore surface defining an axially fore plane perpendicular to the axis of revolution and axially fore of the axially aft plane, wherein the body and the anode are entirely axially between the axially fore plane and the axially aft plane, said anode disposed opposite to said body and covering an internal annular space, said internal annular space having circular symmetry about the axis of revolution, wherein the internal annular space extends axially fore from the axially aft portion and spans radially from the central portion to the annular portion, said anode being such that, in operation, said anode allows passage of a gas from the internal annular space to a space entirely axially fore of the axially fore plane;
   a gas line passing through the body and opening into the internal annular space;
   a diffuser placed in said internal annular space; and
   a cathode that is mechanically joined to the body, wherein the diffuser and the anode occupy at least 50% of the internal annular space;
   wherein the ion thruster is configured to generate a plasma discharge entirely axially fore of the axially fore plane.

2. The ion thruster of claim 1, wherein the anode makes contact with the diffuser.

3. The ion thruster of claim 1, wherein the diffuser is a porous or cellular diffuser or a chicaned mechanical diffuser.

4. The ion thruster of claim 1, wherein the anode has at least one orifice opening into the internal annular space.

5. The ion thruster of claim 1, wherein the anode is made of one or more metals selected from the group consisting of: aluminum, tantalum, steels and carbon.

6. The ion thruster of claim 1, wherein the anode and the diffuser are one and the same element.

7. The ion thruster of claim 1, wherein a protection of magnetic poles covers an axially fore surface of the central portion and an annular protection of magnetic poles covers an axially fore surface of the annular portion.

8. The ion thruster of claim 1, wherein the diffuser and the anode occupy from 75% to 95% of the internal annular space.

9. A method for generating propulsive thrust for a space vehicle comprising:
   providing an ion thruster according to claim 1;
   introducing the gas via the gas line into said internal annular space of the ion thruster;
   generating an external electric field $\vec{E}$ via said anode and said cathode;
   generating an external magnetic field $\vec{B}$ via the central element and the annular element thus creating a confinement space entirely axially fore of the axially fore plane, said external electric field $\vec{E}$ ionizing the gas introduced into the internal annular space thereby generating the plasma discharge from the ionized gas;
   accelerating ions of the plasma discharge with the external electric field $\vec{E}$ and ejecting the ions out of the confinement space; and
   supplying electrons via the cathode to ensure the plasma discharge and electrical neutrality are both maintained.

10. The method of claim 9, wherein the space vehicle is a probe, a satellite, a space capsule, a space shuttle or a space station.

* * * * *